(12) United States Patent
Louis et al.

(10) Patent No.: US 12,291,175 B2
(45) Date of Patent: May 6, 2025

(54) SYSTEM AND METHOD FOR CLEANING SENSORS OF A VEHICLE

(71) Applicant: Bayerische Motoren Werke Aktiengesellschaft, Munich (DE)

(72) Inventors: Lawrence Louis, Munich (DE); Luca Parolini, Landshut (DE); Mathias Pinsel, Haar (DE); Mark Zellerhoff, Wippenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 18 days.

(21) Appl. No.: 17/641,276

(22) PCT Filed: Aug. 21, 2020

(86) PCT No.: PCT/EP2020/073511
§ 371 (c)(1),
(2) Date: Mar. 8, 2022

(87) PCT Pub. No.: WO2021/047892
PCT Pub. Date: Mar. 18, 2021

(65) Prior Publication Data
US 2022/0289147 A1    Sep. 15, 2022

(30) Foreign Application Priority Data

Sep. 9, 2019   (DE) .................. 10 2019 124 099.9

(51) Int. Cl.
*B60S 1/56*  (2006.01)
*B60W 60/00*  (2020.01)
(52) U.S. Cl.
CPC .............. *B60S 1/56* (2013.01); *B60W 60/00* (2020.02); *B60W 2520/00* (2013.01); *B60W 2555/20* (2020.02)

(58) Field of Classification Search
CPC ..... B60S 1/56; B60W 60/00; B60W 2555/20; B60W 2520/00
See application file for complete search history.

(56) References Cited

U.S. PATENT DOCUMENTS

| 10,173,646 B1 | 1/2019 | Rice et al. |
| 2011/0073142 A1 | 3/2011 | Hattori et al. |
| (Continued) | | |

FOREIGN PATENT DOCUMENTS

| CN | 103448685 A | 12/2013 |
| CN | 109606318 A | 4/2019 |
| (Continued) | | |

OTHER PUBLICATIONS

Japanese-language Office Action issued in Japanese Application No. 2022-514747 dated Mar. 22, 2023 with English translation (six (6) pages).

(Continued)

*Primary Examiner* — James J Lee
*Assistant Examiner* — Steven Vu Nguyen
(74) *Attorney, Agent, or Firm* — Crowell & Moring LLP

(57) ABSTRACT

A system for cleaning sensors of a vehicle includes at least one cleaning apparatus which is configured to clean a number of sensors of a vehicle and a control apparatus which is configured to control the at least one cleaning apparatus. The control apparatus is also configured so as, on the basis of at least one situation parameter, to select a plurality of sensors which are intended to be cleaned from the number of sensors and to determine the order in which the selected plurality of sensors are intended to be cleaned.

7 Claims, 2 Drawing Sheets

(56) References Cited

U.S. PATENT DOCUMENTS

| | | | |
|---|---|---|---|
| 2019/0009752 A1* | 1/2019 | Rice | .......................... B60S 1/56 |
| 2019/0100168 A1 | 4/2019 | Krishnan et al. | |
| 2019/0135239 A1 | 5/2019 | Rice | |
| 2019/0202407 A1 | 7/2019 | Jia et al. | |
| 2019/0322245 A1* | 10/2019 | Kline | .................... B60S 1/0848 |
| 2020/0094784 A1 | 3/2020 | Herman et al. | |
| 2020/0122691 A1* | 4/2020 | Werner | .................. B60S 1/481 |
| 2020/0139939 A1 | 5/2020 | Kubota et al. | |
| 2020/0207312 A1 | 7/2020 | Kamiya et al. | |
| 2020/0331438 A1 | 10/2020 | Matsushita et al. | |
| 2021/0197769 A1 | 7/2021 | Shirakura et al. | |
| 2022/0348168 A1* | 11/2022 | Suzuki | ............... G02B 27/0006 |

FOREIGN PATENT DOCUMENTS

| | | |
|---|---|---|
| DE | 10 2016 220 011 A1 | 4/2018 |
| DE | 10 2019 125 303 A1 | 3/2020 |
| JP | 2015-231765 A | 12/2015 |
| JP | 2019-1447 A | 1/2019 |
| JP | 2019-104364 A | 6/2019 |
| JP | 2019-104365 A | 6/2019 |
| JP | WO 2018/230558 A1 | 4/2020 |
| JP | WO 2019/022038 A1 | 5/2020 |
| JP | WO 2019/049381 A1 | 9/2020 |
| WO | WO 2019/073975 A1 | 4/2019 |
| WO | WO 2020/030860 A1 | 2/2020 |

OTHER PUBLICATIONS (R) Taxonomy and Definitions for Terms Related to Driving Automation Systems for On-Road Motor Vehicles, Surface Vehicle Recommended Practice, SAE (Society of Automotive Engineering) International, J3016TM, Sep. 2016, pp. 1-30 (30 pages).

Rechtsfolgen zunehmender Fahrzeugautomatisierung, Bundesanstalt fuer Strassenwesen (BASt) [German Federal Highway Research Institute], Forschung kompakt [Research News], Edition Nov. 2012 with English Abstract (two (2) pages).

International Search Report (PCT/ISA/210) issued in PCT Application No. PCT/EP2020/073511 dated Nov. 10, 2020 with English translation (five (5) pages).

German-language Written Opinion (PCT/ISA/237) issued in PCT Application No. PCT/EP2020/073511 dated Nov. 10, 2020 (five (5) pages).

German-language Search Report issued in German Application No. 10 2019 124 099.9 dated Oct. 5, 2021 with partial English translation (13 pages).

Chinese-language Office Action issued in Chinese Application No. 202080054852.2 dated Mar. 28, 2023 with English translation (11 pages).

Korean-language Office Action issued in Korean Application No. 10-2022-7005300 dated Jul. 21, 2023 with English translation (9 pages).

* cited by examiner

SYSTEM AND METHOD FOR CLEANING SENSORS OF A VEHICLE

FIELD OF DISCLOSURE

The present disclosure relates to a system for cleaning sensors of a vehicle, to a vehicle having such a system and to a method for cleaning sensors of a vehicle. The present disclosure relates, in particular, to efficient removal of soiling from sensors, for example in a field of view of a camera, which are used during automated, and in particular autonomous, driving, for example.

BACKGROUND AND SUMMARY OF THE DISCLOSURE

Modern vehicles comprise a number (multiple) of different sensor systems, for example a LiDAR system, a radar system, a camera and an ultrasonic system. Such sensor systems may be used for many different applications, for example for driving assistance systems for automated driving. Automated driving may involve driving for a relatively long time, for example on the freeway, or time-limited driving when parking or maneuvering. Such a driving assistance system uses data from the sensor systems to control the vehicle. It is essential here for the surroundings of the vehicle to be determined unambiguously and as accurately as possible.

Depending on the weather conditions, there may be soiling of the sensors and therefore an impairment of a capture region or field of view of the sensors. In order to ensure that the surroundings are reliably captured by the sensors, it is advantageous to efficiently remove the soiling in the capture region or field of view of the sensors.

It is an object of the present disclosure to specify a system for cleaning sensors of a vehicle, a vehicle having such a system and a method for cleaning sensors of a vehicle, which can ensure that the surroundings are captured by the sensors. In particular, it is an object of the present disclosure to make a driving assistance function for automated, and in particular autonomous, driving more reliable.

This object is achieved by means of the subject matter of the independent claims. Advantageous configurations are specified in the subclaims.

One independent aspect of the present disclosure specifies a system for cleaning sensors of a vehicle, in particular a motor vehicle. The system comprises at least one cleaning apparatus which is configured to clean multiple sensors of a vehicle; and a control apparatus which is configured to control the at least one cleaning apparatus. The control apparatus is also configured to select a plurality of sensors from the multiple sensors, which are intended to be cleaned, on the basis of at least one situation parameter and to determine the order in which or the prioritization with which the selected plurality of sensors are intended to be cleaned. The prioritization may be effected at least partially in this case on the basis of the same at least one situation parameter as the selection, at least one different situation parameter to the selection or in a different manner to the selection.

According to the invention, a plurality of sensors are first of all selected on the basis of the at least one situation parameter and are then prioritized. This makes it possible to minimize a number of the sensors to be cleaned, thus making it possible to save resources and time during cleaning. For example, sensors which are not used in the current or an imminent situation may not be cleaned unnecessarily. In addition, the resources can be used efficiently on account of the prioritization of the sensors, thus making it possible to improve safety of an automated driving function, for example.

Within the scope of the present disclosure, the term "situation parameter" relates to a circumstance which occurs and/or is relevant in a current or imminent situation of the vehicle. The sensors can therefore be cleaned in a situation-dependent manner. In particular, the cleaning procedure can be dynamically and flexibly adapted, thus making it possible to clean the sensors of the vehicle in an efficient and resource-saving manner.

The control apparatus is preferably also configured to dynamically update the selection of the plurality of sensors from the multiple sensors and the order in which the selected plurality of sensors are cleaned during operation of the vehicle. In other words, the selection and the order of the sensors to be cleaned are continuously adapted. This makes it possible to flexibly react to changing circumstances, with the result that the sensors are cleaned in an optimum and resource-saving manner in any situation.

The control apparatus is preferably also configured to select the plurality of sensors from the multiple sensors and to determine the order in which the selected plurality of sensors are cleaned on the basis of a driving strategy.

A vehicle driving in an automated manner independently steers and/or brakes and/or accelerates on the basis of a driving strategy. The driving strategy may be determined on the basis of surroundings data from the surroundings sensor system, the road condition, the traffic situation, the weather situation, etc. The determined driving strategy is implemented by the drive, the steering system and/or the brakes. Cleaning the sensors on the basis of the driving strategy makes it possible to ensure that the sensors needed to implement the determined driving strategy provide precise and correct data. The driving strategy can therefore be implemented reliably and safety can be improved.

The control apparatus is preferably also configured to determine the order in which the selected plurality of sensors are cleaned on the basis of priorities of the plurality of sensors, for example for the driving strategy. Within the scope of the present disclosure, the term "priority" relates to an importance of the sensors, for example with respect to required cleaning and/or a function of the vehicle, such as an automated driving function. For example, heavily soiled sensors may have a higher priority and may therefore be cleaned before sensors with less soiling. Additionally or alternatively, sensors which are important for a function of the vehicle may be cleaned before or instead of less important sensors.

The at least one situation parameter is preferably selected from the group comprising or consisting of a driving state, a vehicle state, a degree of soiling of the plurality of sensors (for example coverage of a sensor surface with extraneous material) and an environmental situation of the vehicle. However, the present disclosure is not restricted thereto and the at least one situation parameter may comprise any parameter which is suitable for suitably describing a situation of the vehicle with respect to the cleaning of the sensors.

The driving state is preferably selected from the group comprising or consisting of a position of the vehicle (for example in real time and/or on the road, for example in which lane the vehicle is driving), a speed of the vehicle, a traffic situation (for example traffic density) and a route.

The vehicle state is preferably selected from the group comprising or consisting of a cleaning agent supply, an availability of the at least one cleaning apparatus and an energy consumption of the vehicle. The availability of the at least one cleaning apparatus may be restricted, for example, if a cleaning apparatus is defective or no cleaning agent is available. Taking into account the energy consumption of the vehicle makes it possible to adapt an energy consumption required for cleaning, for example in order to save energy during cleaning in the case of a high energy consumption for an air-conditioning system.

The environmental situation of the vehicle is preferably selected from the group comprising or consisting of a weather condition and an outside temperature. The weather condition may be a weather situation, for example sun, rain, snow, ice, fog, wind etc. The weather condition may be, for example, a weather condition on the route, for example rain in 2 km. This makes it possible to proactively clean the sensors, with the result that sensors which are already operating in an optimum manner are provided in the event of a change in the weather conditions.

A further independent aspect of the present disclosure specifies a vehicle, in particular a motor vehicle. The vehicle comprises the system for cleaning sensors and the multiple sensors according to the embodiments of the present disclosure.

The term "vehicle" comprises an automobile, a truck, buses, motorhomes, motorcycles, etc., which are used to transport persons, goods, etc. In particular, the term comprises motor vehicles for transporting persons.

The multiple sensors are preferably selected from the group comprising or consisting of a LiDAR sensor, a radar sensor, a camera and an ultrasonic sensor. The multiple sensors may also be referred to as an "environmental sensor system". The environmental sensor system may provide surroundings data (also referred to as "environmental data") which represent an environmental region of the vehicle and are used, for example, in a driving assistance system for controlling the vehicle.

The vehicle preferably comprises a driving assistance system for automated driving, wherein the driving assistance system uses at least some of the multiple sensors.

Within the scope of the document, the term "automated driving" may be understood as meaning driving with automated longitudinal or lateral guidance or autonomous driving with automated longitudinal and lateral guidance. Automated driving may involve, for example, driving on the freeway for a relatively long time or time-limited driving when parking or maneuvering. The term "automated driving" comprises automated driving with any desired degree of automation. Exemplary degrees of automation are assisted, partially automated, highly automated, fully automated and autonomous driving. The first four of these degrees of automation were defined by the Federal Highway Research Institute (BASt) (see BASt publication "Forschung kompakt", issue November 2012).

During assisted driving, the driver permanently carries out the longitudinal or lateral guidance, while the system performs the respective other function within certain limits. During partially automated driving, the system performs the longitudinal and lateral guidance for a certain period and/or in specific situations, in which case the driver must permanently monitor the system, as during assisted driving. In highly automated driving, the system performs the longitudinal and lateral guidance for a certain period without the driver having to permanently monitor the system; however, the driver must be able to take over the vehicle guidance in a certain time. During fully automated driving, the system can automatically manage the driving in all situations for a specific application; a driver is no longer required for this application.

The four degrees of automation mentioned above correspond to SAE levels 1 to 4 of the SAE J3016 standard (SAE—Society of Automotive Engineering). For example, highly automated driving corresponds to level 3 of the SAE J3016 standard. Furthermore, in SAE J3016, SAE level 5 is also provided as the highest degree of automation which is not included in the definition by the BASt. SAE level 5 corresponds to driverless driving in which the system can automatically manage all situations like a human driver during the entire journey; a driver is generally no longer required. The embodiments of the present disclosure can be used for all degrees of automation and, in particular, for the degrees of automation mentioned above, SAE levels 1 to 5.

A further independent aspect of the present disclosure specifies a method for cleaning sensors of a vehicle. The method comprises selecting a plurality of sensors, which are intended to be cleaned, on the basis of at least one situation parameter; determining the order in which the selected plurality of sensors are intended to be cleaned (for example on the basis of the at least one situation parameter); and cleaning the plurality of sensors in the previously determined order.

The method may implement the aspects of the system described in this document.

A further independent aspect specifies a storage medium. The storage medium may comprise a software program which is configured to be executed on one or more processors and to thereby carry out the method described in this document.

Exemplary embodiments of the disclosure are illustrated in the figures and are described in more detail below.

DETAILED DESCRIPTION OF THE DRAWINGS

Identical reference signs are used for identical and identically acting elements below, unless noted otherwise.

Automated driving generally requires the use of a plurality of redundant sensor systems. One of the greatest challenges involves ensuring the clearest possible view under various road conditions, even if there are conditions which would cause soiling of the camera lenses, for example. Since the probability of a functional impairment caused by dirt, snow, ice etc. depends greatly on the sensor position and the aerodynamics, most sensors require a cleaning system in order to enable a high degree of availability.

Figure 1:
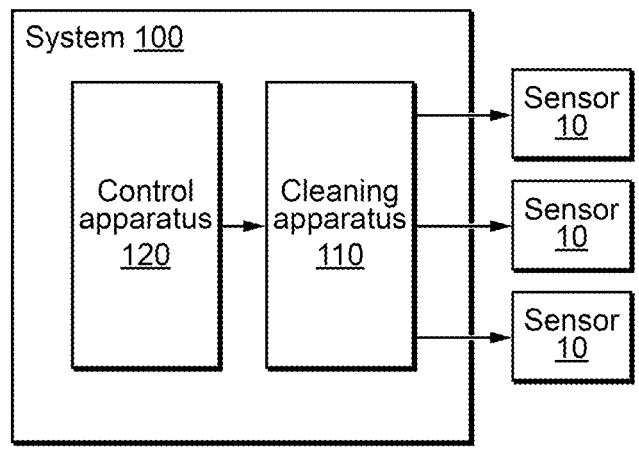
FIG. 1 schematically shows a system for cleaning sensors of a vehicle according to embodiments of the present disclosure.

FIG. 1 schematically shows a system 100 for cleaning sensors of a vehicle according to embodiments of the present disclosure.

The system 100 comprises at least one cleaning apparatus 110 which is configured to clean multiple sensors 10 of a vehicle; and an electronic control apparatus 120 which is configured to control the at least one cleaning apparatus 110 and may be, for example, a processor based control apparatus. The control apparatus 120 is also configured to select a plurality of sensors from the multiple sensors 10, which are intended to be cleaned, on the basis of at least one situation parameter and to determine the order in which or the prioritization with which the selected plurality of sensors are intended to be cleaned.

The sensors can therefore be cleaned in a situation-dependent manner. In particular, the cleaning procedure can be flexibly adapted, with the result that the sensors can be cleaned in an efficient and resource-saving manner. Depending on a current driving situation, an autonomous vehicle could dispense with a redundant sensor, for example. This makes it possible for the system to clean the surface of the sensor in order to restore the availability for subsequent scenarios in which this sensor might be decisive. In order to take into account different driving situations, a priority of important sensors and optionally their cleaning time are stipulated. This cleaning priority may change during the journey.

In some embodiments, a cleaning apparatus 110 may be assigned to a single sensor or may clean a single sensor. Furthermore, a cleaning apparatus 110 may be assigned to two or more sensors or may clean two or more sensors. The assignment between the at least one cleaning apparatus 110 and the multiple sensors 10 is not restricted thereto, however, and can be provided in any suitable manner.

In some embodiments, the at least one cleaning apparatus 110 may be configured to clean one or more corresponding sensors by means of air, gas and/or cleaning agent (for example water, to which a cleaning agent and/or antifreeze is optionally added). The at least one cleaning apparatus 110 may comprise, for example, a nozzle which is aimed at a corresponding sensor.

The control apparatus 120 is preferably also configured to dynamically update the selection of the plurality of sensors from the multiple sensors 10 and the order in which the selected plurality of sensors are cleaned during operation of the vehicle. In other words, the selection and the order of the sensors to be cleaned are continuously adapted. This makes it possible to flexibly react to changing circumstances, with the result that the sensors 10 are cleaned in an optimum and resource-saving manner in any situation.

The control apparatus 120 may also be configured to select the plurality of sensors from multiple sensors 10 and to determine the order in which the selected plurality of sensors are cleaned on the basis of a driving strategy. Cleaning the sensors on the basis of the driving strategy makes it possible to ensure that the sensors needed to implement the determined driving strategy provide precise and correct data. The driving strategy can therefore be reliably implemented and safety can be improved.

The control apparatus 120 is typically also configured to determine the order in which the selected plurality of sensors are cleaned on the basis of priorities of the plurality of sensors, for example for the driving strategy. The term "priority" relates in this case to an importance or a contribution of the sensors, for example with respect to a function of the vehicle, such as an automated driving function. For example, sensors which are important for a function of the vehicle or sensors which make a great contribution to the functioning of the function may be cleaned first or with higher priority.

At least one situation parameter is typically selected from the group comprising or consisting of a driving state, a vehicle state, a degree of soiling of the plurality of sensors, an environmental situation of the vehicle and combinations thereof.

The driving state may be selected from the group comprising or consisting of a position of the vehicle, a speed of the vehicle, a traffic situation and a route.

The vehicle state may be selected from the group comprising or consisting of a cleaning agent supply, an availability of the at least one cleaning apparatus and an energy consumption of the vehicle. The availability of the at least one cleaning apparatus may be restricted, for example, if a cleaning apparatus is defective or no cleaning agent is available. Taking into account the energy consumption of the vehicle makes it possible to adapt an energy consumption required for cleaning, for example in order to save energy during cleaning in the case of a high energy consumption for an air-conditioning system.

The environmental situation of the vehicle may be selected from the group comprising or consisting of a weather condition and an outside temperature. The weather condition may be a weather situation, for example wind, sun, rain, snow, ice, fog, etc.

Figure 2:
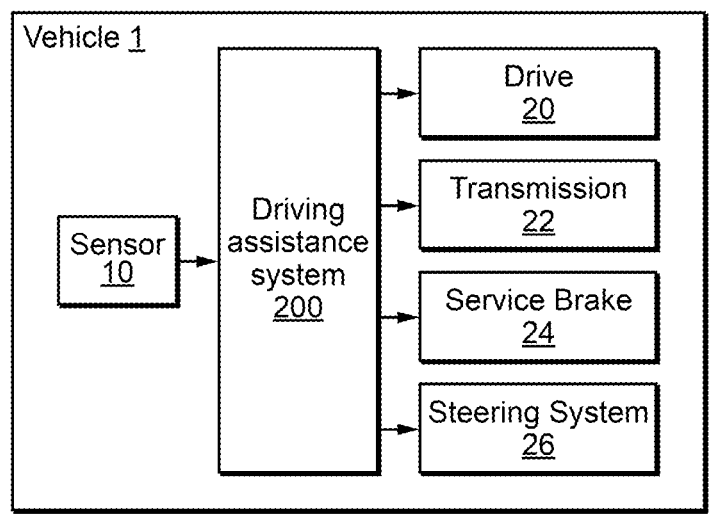
FIG. 2 schematically shows a vehicle having a driving assistance system according to embodiments of the present disclosure.

FIG. 2 schematically shows a vehicle 1 having a driving assistance system 200 for automated driving according to embodiments of the present disclosure. The vehicle 1 may be a motor vehicle, in particular.

The vehicle 1 may comprise the driving assistance system 200 and the system for cleaning sensors according to the embodiments of the present disclosure. The driving assistance system 200 may be configured for automated driving.

During automated driving, the longitudinal and lateral guidance of the vehicle 1 is carried out automatically. The driving assistance system 200 therefore performs the vehicle guidance. For this purpose, the driving assistance system 200 controls the drive 20, the transmission 22, the hydraulic service brake 24 and the steering system 26 using intermediate units which are not illustrated.

In order to plan and carry out automated driving, surroundings information from a surrounding sensor system, which observes the vehicle surroundings, is received by the driver assistance system 200. In particular, the vehicle 1 may comprise the multiple sensors 10 according to the embodiments of the present disclosure which are configured to acquire environmental data indicating the vehicle surroundings. The multiple sensors 10 may comprise, for example, a lidar system, a radar system and/or a camera. The sensors 10 are dynamically prioritized by the system of the present disclosure and are accordingly cleaned.

Figure 3:
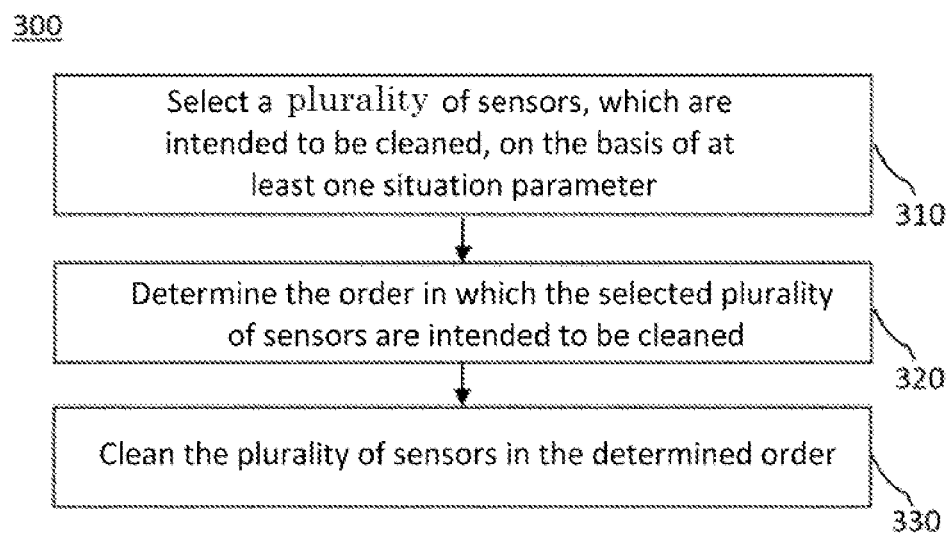
FIG. 3 schematically shows a flowchart of a method for cleaning sensors of a vehicle according to embodiments of the present disclosure.

FIG. 3 schematically shows a flowchart of a method 300 for cleaning sensors of a vehicle according to embodiments of the present disclosure. The method 300 may be implemented by means of appropriate software which can be executed by a processor (for example a CPU).

The method 300 comprises, in block 310, selecting a plurality of sensors, which are intended to be cleaned, on the basis of at least one situation parameter; in block 320, determining the order in which the selected plurality of sensors are intended to be cleaned (for example on the basis of the at least one situation parameter); and, in block 330, cleaning the plurality of sensors in the determined order.

The method 300 may implement the aspects of the system, described in this document, for cleaning sensors of a vehicle.

According to the invention, a plurality of sensors are selected and prioritized on the basis of the at least one situation parameter. This makes it possible to minimize a number of the sensors to be cleaned, thus making it possible to save resources and time during cleaning. For example, sensors which are not used in the current situation may not be cleaned unnecessarily. In addition, the resources can be used efficiently on account of the prioritization, thus making it possible to improve safety of an automated driving function, for example.

The invention claimed is:

1. A system for cleaning sensors of a vehicle, comprising:
   at least one cleaning apparatus which is configured to clean multiple sensors of the vehicle; and
   a control apparatus which is configured to control the at least one cleaning apparatus,
   wherein the control apparatus is further configured to select a plurality of sensors which are intended to be cleaned from the multiple sensors on the basis of at least one situation parameter and to determine an order in which the selected plurality of sensors are intended to be cleaned, and
   wherein the at least one situation parameter comprises an energy consumption of the vehicle considering a high energy consumption for another vehicle component.

2. The system according to claim 1, wherein
   the control apparatus is further configured to dynamically update the selection of the plurality of sensors from the multiple sensors and the order in which the selected plurality of sensors are cleaned during operation of the vehicle.

3. The system according to claim 1, wherein
   the control apparatus is further configured to select the plurality of sensors from the multiple sensors and to determine the order in which the selected plurality of sensors are cleaned on the basis of priorities of the plurality of sensors for a driving strategy, and the vehicle is configured to automatically steer and/or brake and/or accelerate on the basis of the driving strategy.

4. A vehicle comprising the system according to claim 1.

5. The vehicle according to claim 4, further comprising: a driving assistance system for automated driving, wherein the driving assistance system uses at least some of the multiple sensors.

6. A method for cleaning sensors of a vehicle, comprising:
   selecting a plurality of sensors which are intended to be cleaned on the basis of at least one situation parameter;
   determining an order in which the selected plurality of sensors are intended to be cleaned; and
   cleaning the plurality of sensors in the determined order,
   wherein the at least one situation parameter comprises an energy consumption of the vehicle considering a high energy consumption for another vehicle component.

7. A computer product comprising a non-transitory computer readable medium having stored thereon program code which, when executed on one or more processors, carries out the acts of:
   selecting a plurality of sensors of a vehicle which are intended to be cleaned on the basis of at least one situation parameter;
   determining an order in which the selected plurality of sensors are intended to be cleaned; and
   cleaning the plurality of sensors in the determined order,
   wherein the at least one situation parameter comprises an energy consumption of the vehicle considering a high energy consumption for another vehicle component.

* * * * *